US009225424B2

(12) United States Patent
Odaka et al.

(10) Patent No.: US 9,225,424 B2
(45) Date of Patent: Dec. 29, 2015

(54) DYNAMIC BANDWIDTH ALLOCATION METHOD, OLT, AND PON SYSTEM

(71) Applicant: Hitachi, Ltd., Tokyo (JP)

(72) Inventors: Toshiyuki Odaka, Tokyo (JP); Jun Sugawa, Tokyo (JP); Hidehiro Toyoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 14/065,750

(22) Filed: Oct. 29, 2013

(65) Prior Publication Data

US 2014/0294388 A1 Oct. 2, 2014

(30) Foreign Application Priority Data

Mar. 29, 2013 (JP) .................................. 2013-070915

(51) Int. Cl.
H04J 14/00 (2006.01)
H04B 10/27 (2013.01)
H04J 3/16 (2006.01)

(52) U.S. Cl.
CPC .............. *H04B 10/27* (2013.01); *H04J 3/1694* (2013.01)

(58) Field of Classification Search
CPC ....... H04B 10/27; H04J 3/1694; H04H 20/46; H04L 2012/5642; H04N 7/17309
USPC ................................................ 398/66, 67, 71
See application file for complete search history.

(56) References Cited

U.S. PATENT DOCUMENTS

| | | | | |
|---|---|---|---|---|
| 6,486,992 B1 * | 11/2002 | Sasaki ................... | H04B 10/114 | 398/161 |
| 6,915,084 B2 * | 7/2005 | Ho ...................... | H04B 10/2543 | 398/158 |
| 7,088,921 B1 * | 8/2006 | Wood .................. | H04J 14/0226 | 398/67 |
| 7,738,590 B2 * | 6/2010 | Murakami ........... | H04B 1/0475 | 375/295 |
| 7,970,010 B2 * | 6/2011 | Denney ................ | H04J 3/1694 | 370/468 |
| 8,155,530 B2 * | 4/2012 | Ali ....................... | H04B 10/505 | 398/147 |
| 8,279,892 B2 * | 10/2012 | Denney ................ | H04J 3/1694 | 370/468 |
| 8,705,965 B2 * | 4/2014 | Sugawa ............. | H04Q 11/0067 | 398/66 |
| 8,711,878 B2 * | 4/2014 | Denney ................ | H04J 3/1694 | 370/468 |
| 8,818,201 B2 * | 8/2014 | Healey ................ | H04B 10/032 | 398/1 |
| 8,861,954 B2 * | 10/2014 | Sugawa ............... | H04B 10/272 | 398/34 |
| 8,879,905 B2 * | 11/2014 | Li ....................... | H04B 10/0795 | 398/16 |
| 8,891,973 B2 * | 11/2014 | Tanaka ................ | H04B 10/272 | 398/155 |
| 8,897,644 B2 * | 11/2014 | Sugawa ............... | H04J 3/1694 | 398/70 |

(Continued)

FOREIGN PATENT DOCUMENTS

| | | |
|---|---|---|
| JP | 2010-509812 A | 3/2010 |
| WO | 2008/055438 A1 | 5/2008 |

*Primary Examiner* — Ken Vanderpuye
*Assistant Examiner* — Abbas H Alagheband
(74) *Attorney, Agent, or Firm* — Volpe and Koenig, P.C.

(57) ABSTRACT

In a PON system in which plural kinds of modulation schemes coexist, when uplink burst signals from respective ONUs are received, the receiving efficiency degrades as the number of the times of switching of the modulation scheme increases. In an optical access (PON) system supporting plural kinds of modulation schemes, an OLT allocates bandwidths for uplink signals, i.e., transmission timings each including a transmission start time and a transmission duration, to ONUs, respectively, such that the bandwidths allocated to plural ONUs for the same modulation scheme are as successive as possible. Based on the transmission timings allocated to the respective ONUs, the OLT switches the modulation scheme of a modulation-scheme variable burst-mode optical transmitter/receiver by control of a modulation scheme controller.

10 Claims, 7 Drawing Sheets

(56) References Cited

U.S. PATENT DOCUMENTS

| | | | | |
|---|---|---|---|---|
| 8,917,990 B2* | 12/2014 | Trojer | H04B 10/272 | 398/66 |
| 8,938,168 B2* | 1/2015 | Yamashita | H04J 3/0682 | 398/71 |
| 8,948,596 B2* | 2/2015 | Nielsen | H04B 3/50 | 398/115 |
| 8,965,206 B2* | 2/2015 | Sugawa | H04J 14/0227 | 398/69 |
| 2006/0029398 A1* | 2/2006 | Liu | H04B 10/506 | 398/188 |
| 2006/0126505 A1* | 6/2006 | Denney | H04J 3/1694 | 370/229 |
| 2006/0126506 A1* | 6/2006 | Denney | H04J 3/1694 | 370/229 |
| 2006/0126660 A1* | 6/2006 | Denney | H04J 3/1694 | 370/468 |
| 2006/0136975 A1* | 6/2006 | Murakami | H04B 1/0475 | 725/117 |
| 2008/0063396 A1* | 3/2008 | Yu | H04B 10/505 | 398/42 |
| 2008/0288852 A1* | 11/2008 | Uehara | H04L 1/0065 | 714/786 |
| 2008/0310842 A1* | 12/2008 | Skrobko | H04B 10/25753 | 398/72 |
| 2009/0180785 A1* | 7/2009 | Tajima | H04B 10/5055 | 398/183 |
| 2010/0135654 A1* | 6/2010 | Pincemin | H04B 10/0775 | 398/25 |
| 2010/0136915 A1* | 6/2010 | Fukumura | H04L 1/0003 | 455/63.1 |
| 2010/0239255 A1* | 9/2010 | Ikeda | H04J 3/1694 | 398/66 |
| 2010/0239264 A1* | 9/2010 | Yang | H04B 10/505 | 398/98 |
| 2011/0008062 A1* | 1/2011 | Ashdown | H04B 10/116 | 398/212 |
| 2011/0194508 A1* | 8/2011 | Beser | H04N 21/6168 | 370/329 |
| 2011/0211837 A1* | 9/2011 | Sugawa | H04Q 11/0067 | 398/67 |
| 2012/0163809 A1* | 6/2012 | Sugawa | H04B 10/272 | 398/34 |
| 2013/0004172 A1* | 1/2013 | Sugawa | H04J 3/1694 | 398/72 |
| 2013/0070784 A1* | 3/2013 | Denney | H04J 3/1694 | 370/462 |
| 2013/0142513 A1* | 6/2013 | Chen | H04B 10/27 | 398/66 |
| 2013/0142514 A1* | 6/2013 | Chen | H04B 10/27 | 398/66 |
| 2013/0142515 A1* | 6/2013 | Chen | H04B 10/27 | 398/67 |
| 2014/0161456 A1* | 6/2014 | Sugawa | H04J 14/0227 | 398/72 |

* cited by examiner

FIG. 8

| FIELDS | OCTETS |
|---|---|
| DESTINATION ADDRESS | 6 |
| SOURCE ADDRESS | 6 |
| LENGTH/TYPE=0X8808 | 2 |
| OPCODE=0X0002 | 2 |
| TIMESTAMP | 4 |
| NUMBER OF GRANTS/FLAGS | 1 |
| GRANT #1 START TIME | [4] |
| GRANT #1 LENGTH | [2] |
| GRANT #2 START TIME | [4] |
| GRANT #2 LENGTH | [2] |
| GRANT #3 START TIME | [4] |
| GRANT #3 LENGTH | [2] |
| GRANT #4 START TIME | [4] |
| GRANT #4 LENGTH | [2] |
| MODULATION TYPE | [2] |
| PAD=0 | 13/39 |
| FRAME CHECK SEQUENCE | 4 |

| ONU-ID | START_TIME | MODULATION SCHEME |
|---|---|---|
| 1 | STIME1 | QPSK |
| 2 | STIME2 | 16QAM |
| 3 | STIME3 | QPSK |
| 4 | STIME4 | 16QAM |
| : | : | : |
| 63 | STIME63 | QPSK |
| 64 | STIME64 | 16QAM |

DYNAMIC BANDWIDTH ALLOCATION METHOD, OLT, AND PON SYSTEM

CLAIM OF PRIORITY

The present application claims priority from Japanese patent application No. JP2013-070915 filed on Mar. 29, 2013, the content of which is hereby incorporated by reference into this application.

BACKGROUND OF THE INVENTION

The present invention relates to an optical communication system and, in particular, to a dynamic bandwidth allocation method which supports multiple modulation schemes, an OLT, and a PON system.

A PON (Passive Optical Network) system generally employs TDMA (Time Division Multiple Access) when transmitting uplink signals from plural ONUs (Optical Network Units, i.e., customer premises equipment) to an OLT (Optical Line Terminal, i.e., station-side equipment). The OLT performs a DBA (Dynamic Bandwidth Allocation) process for allocating a transmission start time and a transmission duration, i.e., a transmission timing of each ONU, based on a transmission request from each ONU, i.e., the data size stored in the ONU. Then, the OLT notifies each ONU of that result. In this manner, it is possible for the OLT to receive the uplink signals transmitted as burst signals from the respective ONUs without collision. In this case, in order to avoid collision between the burst signals from the respective ONUs, it is considered to ensure a certain time interval (guard time). The message format and the sequence of notifications between the OLT and the ONU are defined in IEEE802.3ah Standards as MPCP (Multi-Point Control Protocol). However, an algorithm for dynamic bandwidth allocation is not defined in Standards.

As one technique for effectively using an optical transmission medium in the PON system, a method can be considered which allows plural kinds of modulation schemes to coexist. For example, in some cases the distance from the OLT to each ONU is not constant. In general, an optical signal degrades more largely as the propagation distance becomes longer. Therefore, when 16QAM (Quadrature Amplitude Modulation) is used for an ONU at a relatively short distance from the OLT and QPSK (Quadrature Phase Shift Keying) is used for an ONU at a long distance, the efficiency of the use of the entire transmission medium can be improved.

In the aforementioned PON system including plural kinds of modulation schemes coexisting, the OLT has to switch a modulation scheme set in a modulation-scheme variable burst-mode optical transmitter/receiver provided therein, to correspond to the modulation scheme employed for each ONU in accordance with a timing of transmission of an uplink signal from that ONU. That is, the aforementioned guard time is a time which also includes a time required for switching the modulation scheme (OLT is known).

An exemplary background technique in this art is JP-T-2010-509812.

BRIEF SUMMARY OF THE INVENTION

The aforementioned background technique describes that "category table entries are set in the OLT to record the categories of the ONUs with different transmission rates. The OLT performs allocation of unified time slots to the ONUs with different transmission rates on the basis of the category table entries to generate allocation table entries of uplink bandwidths. In accordance with the allocation table entries of uplink bandwidths, bandwidth allocation instructions to the ONUs with different transmission rates are carried to corresponding downlink optical channels via different wavelengths" (see Abstract of JP-T-2010-509812).

Also, JP-T-2010-509812 describes that "performing allocation of the unified time slots includes grouping the ONUs on the basis of the different transmission rates of the ONUs such that uplink time slots for the ONUs with higher transmission rates are adjacent to each other and uplink time slots for the ONUs with lower transmission rates are adjacent to each other" (see Claim 3 of JP-T-2010-509812).

Moreover, JP-T-2010-509812 describes that "because a switching time of a 1 Gbps ONU laser is much longer than that of a 10 Gbps ONU laser, the 10 Gbps ONU must wait for perfect interception of the laser of the 1 Gbps ONU before transmitting its uplink signal in a case where a message of 10 Gbps and a message of 1 Gbps are adjacent to each other. . . . When uplink messages of 10 Gbps are grouped into one group and uplink messages of 1 Gbps are grouped into one group, the efficiency of allocating the uplink bandwidths is improved" (see paragraph [0058] of JP-T-2010-509812).

As described above, JP-T-2010-509812 describes that the difference between the transmission rates is actually the difference of the laser switching time between the ONUs. However, the difference between the modulation schemes for uplink signals is independent of the laser switching times of uplink signals. That is, when the modulation scheme is different, the transmission rate is usually different, too. However, the laser switching time is determined by the characteristics and/or the performance of the laser, and it has no relationship with the modulation scheme.

As described above, in the PON system in which plural kinds of modulation schemes coexist, when an operation of switching the modulation scheme occurs while the OLT receives uplink burst signals from the respective ONUs in a time schedule based on the DBA process, receiving of the signal becomes impossible during the switching operation. Therefore, it is necessary to ensure the longer guard time to include switching time, resulting in insufficient receiving bandwidth (time). In other words, it is a problem that, as the number of the times of switching the modulation scheme in unit time increases, the receiving efficiency degrades.

It is an object of the present invention to solve the above problem and to provide a dynamic bandwidth allocation method, an OLT, and a PON system which can overcome the above problem and can decrease the number of the times of switching between modulation schemes in the PON system including plural kinds of modulation schemes coexisting to improve the efficiency of receiving an optical signal.

To achieve the above object, according to the present invention, a dynamic bandwidth allocation method is provided in which, when bandwidths for uplink signals transmitted from plural ONUs to an OLT in a PON system supporting plural kinds of modulation schemes, are allocated to the respective ONUs, the allocation is performed such that the bandwidths allocated to plural ONUs employing the same modulation scheme for transmission signals are successive.

To achieve the above object, according to the present invention, an OLT communicable with plural ONUs is provided which includes a modulation-scheme variable burst-mode optical transmitter/receiver arranged to support plural kinds of modulation schemes and connected to an optical fiber between the ONUs and the OLT, a PHY/MAC (Physical/Media Access Control) processor connected to the modulation-scheme variable burst-mode optical transmitter/receiver, an NNI (Network-Network Interface) processor connected to the PHY/MAC processor, an MPCP (Multi-Point Control Protocol) controller arranged to control the PHY/MAC processor, a modulation scheme controller arranged to control the modulation-scheme variable burst-mode optical transmitter/receiver, and an ONU modulation scheme management table arranged to store modulation schemes to be employed by the ONUs. The MPCP controller allocates bandwidths for uplink signals from the ONUs to the respective ONUs.

Moreover, to achieve the above object, according to the present invention, a PON system is provided which includes plural ONUs and an OLT connected to the ONUs via an optical fiber and capable of supporting plural kinds of modulation schemes. The OLT includes a modulation-scheme variable burst-mode optical transmitter/receiver connected to the optical fiber between the OLT and the ONUs, a PHY/MAC processor connected to the modulation-scheme variable burst-mode optical transmitter/receiver, an NNI processor connected to the PHY/MAC processor, an MPCP controller arranged to control the PHY/MAC processor, a modulation scheme controller arranged to control the modulation-scheme variable burst-mode optical transmitter/receiver, and an ONU modulation scheme management table arranged to store modulation schemes to be employed by the ONUs. The MPCP controller allocates bandwidths for uplink signals from the ONUs to the respective ONUs.

According to the present invention, bandwidth allocation for uplink signals to the respective ONUs is performed such that the bandwidths allocated to plural ONUS for the same modulation scheme are successive. Thus, the number of the times of switching the modulation scheme of the optical receiver by the OLT decreases, that is, a time period in which receiving is impossible in unit time decreases, resulting in improvement in the efficiency of using the uplink signal bandwidth.

Moreover, in a case where plural kinds of modulation schemes are switched, an operation of a circuit for an unused modulation scheme can be stopped. Thus, as compared with a case where circuits are kept working in parallel without being switched, power consumption can be reduced.

BRIEF DESCRIPTION OF THE DRAWINGS

FIG. 8 is a diagram showing an example of an expanded GATE message from an OLT to an ONU in the second embodiment; and FIG. 9 is a diagram showing an example of an expanded GATE message from the OLT to the ONU in the first embodiment.

DETAILED DESCRIPTION OF THE INVENTION

Figure 1:
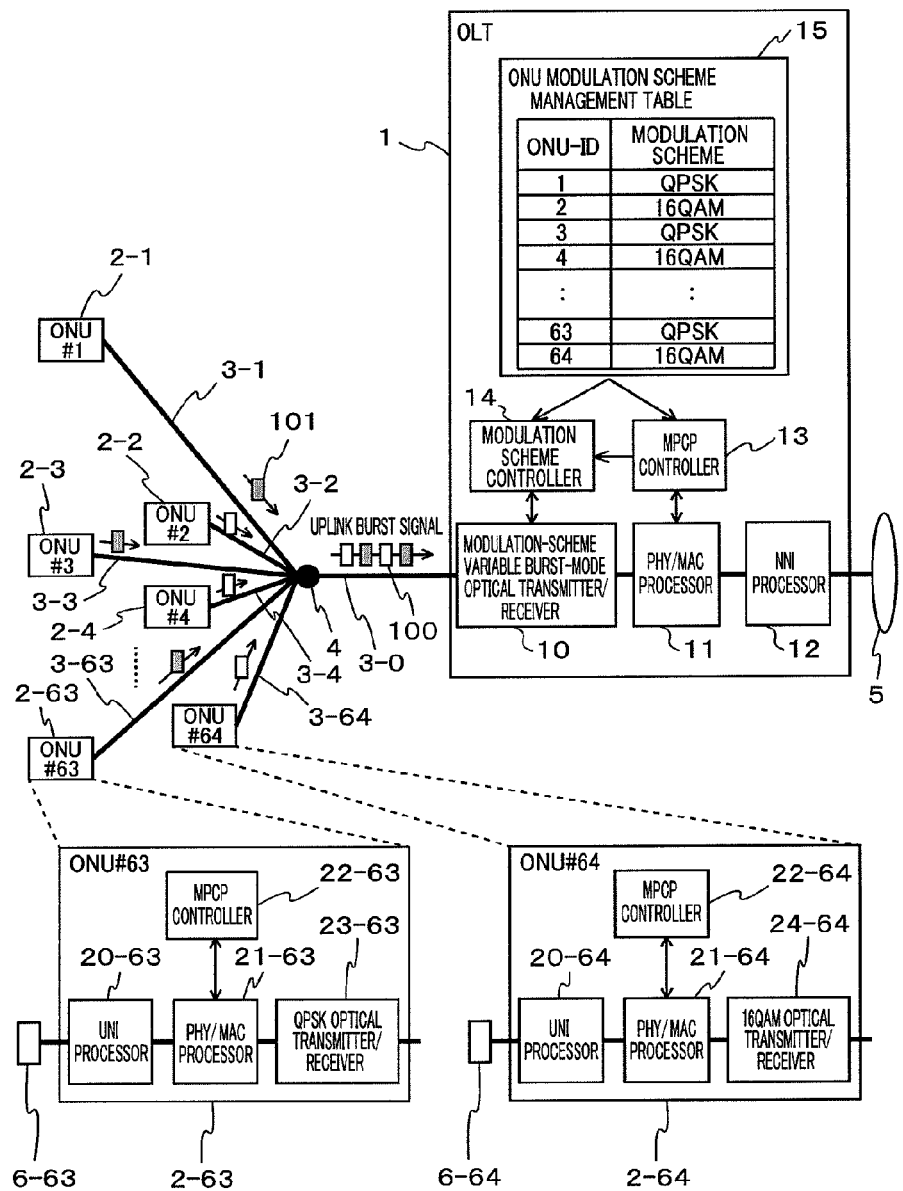
FIG. 1 is a diagram showing an exemplary configuration of a PON system including two kinds of ONUs for different modulation schemes according to a first embodiment of the present invention.

Embodiments of the present invention are now described with reference to the drawings. In the drawings, common components are labeled with the same reference signs. In the embodiments of the present invention, in an optical access (PON) system which supports plural kinds of modulation schemes, when an OLT allocates a bandwidth for an uplink signal, i.e., a transmission timing which includes a transmission start time and a transmission duration to each ONU, allocation is performed such that bandwidths allocated to plural ONUs for the same modulation scheme are as successive as possible. In addition, the OLT switches a modulation scheme of an optical receiver thereof based on the transmission timing allocated to each ONU.

[First Embodiment]

In this embodiment, an exemplary optical access system (PON system) is described in which plural kinds of ONUs for different modulation schemes coexist.

FIG. 1 is a system configuration diagram of an optical access network according to PON (PON system) including two kinds of coexisting ONUs for different modulation schemes. The optical access network of FIG. 1 includes an OLT 1 and plural ONUs 2. The OLT 1 and the ONUs 2 are connected to each other via optical fibers 3. An optical fiber 3-0 from the OLT 1 branches into 64 optical fibers 3-1 to 3-64 at an optical splitter 4 and are then connected to a total of 64 ONUs 2 (2-1 to 2-64) for a plurality kinds of modulation schemes. In this embodiment, an ONU 2-63 for QPSK and an ONU 2-64 for 16 QAM are exemplified. The OLT 1 is also connected to a network 5 and the ONU 2 is connected to a terminal 6. Thus, the PON system of this example provides an environment where the terminal 6 can communicate with a given device within the network 5. In FIG. 1, the terminals 6 other than the terminals 6-63 and 6-64 connected to the ONUs 2-63 and 2-64 are not shown.

In FIG. 1, the OLT 1 includes a modulation-scheme variable burst-mode optical transmitter/receiver 10, a PHY/MAC (Physical/Media Access Control) processor 11, an NNI (Network-Network Interface) processor 12, an MPCP (Multi-Point Control Protocol) processor 13, a modulation scheme controller 14, and an ONU modulation scheme management table 15. The MPCP controller 13 and the modulation scheme controller 14 may be implemented by execution of a program by a CPU (Central Processing Unit), for example, and the ONU modulation scheme management table 15 may be stored in a memory or the like which the CPU can access.

The ONU 2 (2-63) for QPSK is arranged to include a UNI (User-Network Interface) processor 20, a PHY/MAC processor 21, an MPCP controller 22, and a QPSK optical transmitter/receiver 23. The ONU 2 (2-64) for 16 QAM is arranged to include a UNI processor 20, a PHY/MAC processor 21, an MPCP controller 22, and a 16QAM optical transmitter/receiver 24. Those MPCP controllers 22 may be also implemented by execution of a program by the CPU.

Regarding a transmission method in this embodiment, description of a transmission method for a downlink signal from the OLT 1 to the ONU 2 is omitted because that transmission method is not specifically defined. In the optical access system of FIG. 1, the QPSK optical transmitter/receiver 23 or the 16 QAM optical transmitter/receiver 24 is included as the optical transmitter/receiver of the ONU 2.

However, an optical transmitter/receiver of another modulation scheme, e.g., BPSK, 8 PSK, 64 QAM, and 128 QAM may be also employed.

In transmission of an uplink signal from the ONU 2 to the OLT 1, TDMA is employed as described before. In FIG. 1, the uplink signal is shown as an uplink burst signal. Signals 101 burst transmitted individually from the ONUs 2 are synthesized by the optical splitter 4 into a successive uplink burst signal 100 on the optical fiber 3-0. In this synthesis, a method for determining the transmission timings with providing guard times, such that the burst signals from plural ONU-Xs are not overlapped, is the aforementioned DBA (Dynamic Bandwidth Allocation). More specifically, the DMA process is carried out in the MPCP controller 13 of the OLT 1.

Next, operations of the respective devices and the respective function units are described along an expected operation of the PON system in this embodiment.

First, at a start of the operation of the system or immediately after the start of the operation, the ONU modulation scheme management table 15 in the OLT 1 shown in FIG. 1 has to be prepared. In a case where the modulation schemes of the ONUs are fixed as shown in two ONUs (2-63 and 2-64) in FIG. 1, an administrator may directly register data to create the ONU modulation scheme management table 15 when constructing the system. However, when the number of the ONUs becomes larger to some extent, setting of the table 15 needs some costs. Thus, it is desirable to provide means for automatically creating the table 15. Therefore, an example is described next in which the ONU modulation scheme management table 15 is automatically created.

Figures 2, 3:
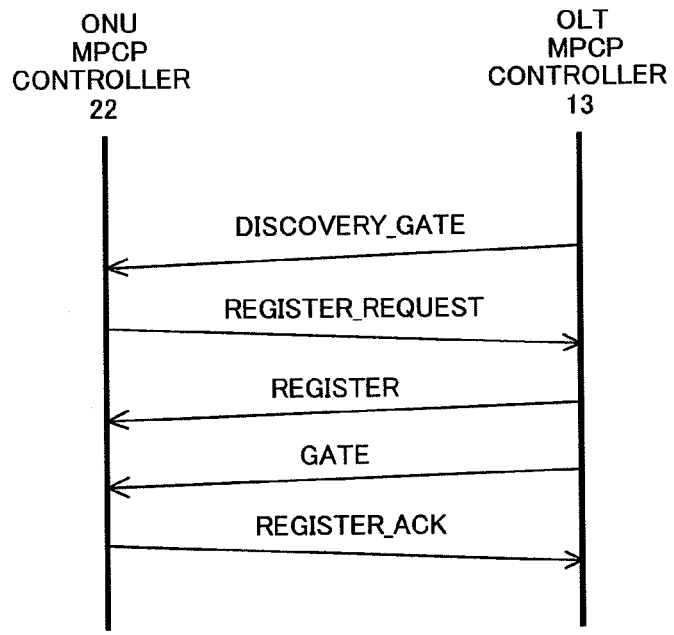
FIG. 2 is a diagram showing an operation sequence of an ONU discovery process in the first embodiment.
FIG. 3 is a diagram showing an exemplary control frame from an ONU to an OLT.

FIG. 2 shows an exemplary operation sequence of a discovery process for recording the ONU 2 in the OLT 1, which is defined in IEEE802.3ah Standards, and shows messages between the MPCP controller 13 of the OLT 1 and the MPCP controller 22 of the ONU 2 at the initiative of the OLT side. First, the MPCP controller 13 of the OLT 1 transmits a DISCOVERY_GATE message in a downstream direction, thereby notifying the ONU side of information on a bandwidth in which a responding message is to be transmitted, i.e., timing information on a transmission start time and a transmission duration.

Based on the received timing information, the MPCP controller 22 of the ONU 2 transmits a REGISTER_REQUEST message to notify the OLT side of a registration request. The MPCP controller 13 of the OLT 1 which received the REGISTER_REQUEST message then transmits a REGISTER message to the corresponding ONU, saying that the registration has been accepted. Subsequently, the OLT side transmits a GATE message in the downstream direction again, thereby notifying the ONU side of information on a bandwidth in which a next responding message is to be transmitted. Based on the received timing information, the ONU side transmits a REGISTER_ACK message. These are defined in Standards and therefore the detailed description thereof is omitted here.

FIG. 3 shows an exemplary structure of the REGISTER_REQUEST message in the sequence diagram of FIG. 2, and shows an example in which a Modulation Type field 3001 is specially added to the structure defined in IEEE for a device of this embodiment. For example, a value of the Modulation Type field 3001 is "0x0001" when indicating QPSK and is "0x0002" when indicating 16 QAM.

In the discovery process of the ONU 2-63 in FIG. 1, the MPCP controller 22-63 of the ONU 2-63 transmits the REGISTER_REQUEST message including "0x0001" in the Modulation Type field 3001 to the OLT 1. The MPCP controller 13 of the OLT 1 receives and processes that REGISTER_REQUEST message and writes "0x0001" indicating QPSK into a modulation scheme cell of the ONU modulation scheme management table 15. In this manner, a part of the table 15 is updated. Similarly, all the connected ONUs 2 perform the discovery process, thereby the ONU modulation scheme management table 15 in the OLT 1 is completed.

Please note that in FIG. 1 the ONU modulation scheme management table 15 includes an ONU-ID column and a modulation-scheme column only for the sake of simplicity. However, needless to say, this table may be prepared as a table in which those contents of the columns are integrated with other information to be normally managed for each ONU 2 by the MPCP controller 13. For example, the table may also include the uplink transmission data amount notified by a REPORT message for every ONU as described later.

Figure 4:
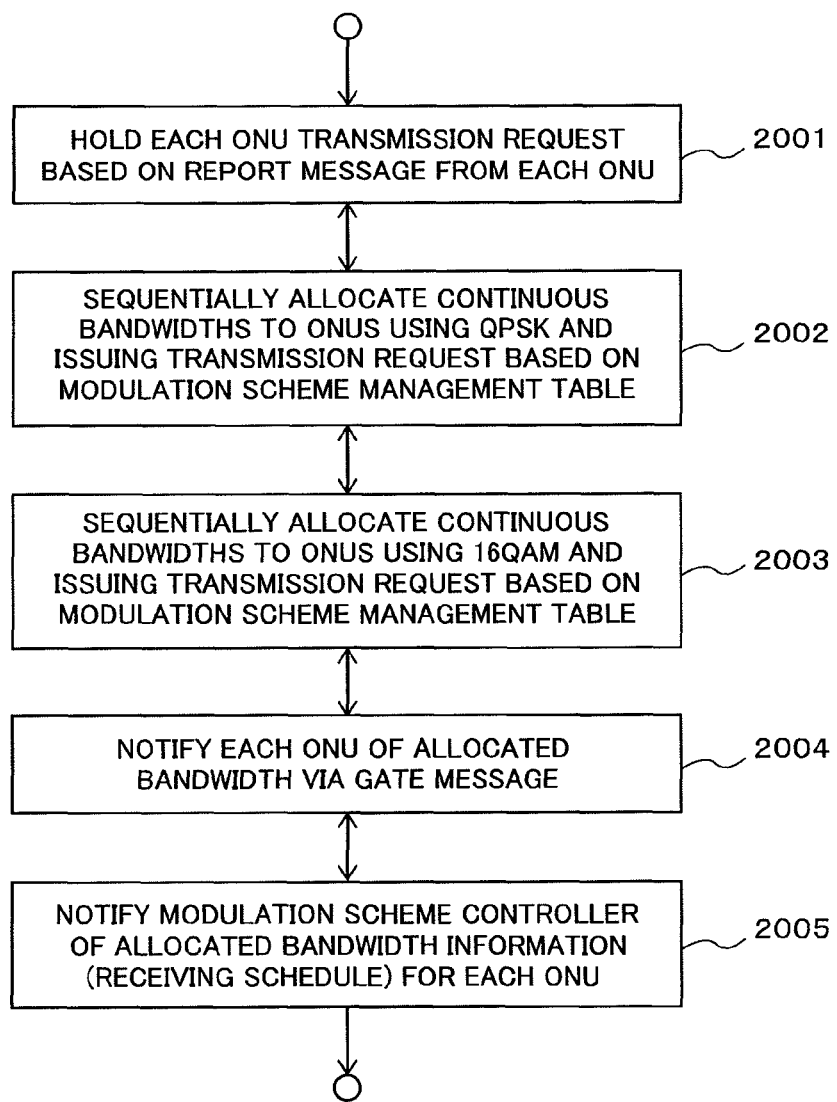
FIG. 4 is a flowchart of a dynamic bandwidth allocation process in an MPCP controller in the OLT in the first embodiment.

Next, a DBA process for uplink signals in the PON system in which plural kinds of modulation schemes coexist is described. The DBA process is a feature of the present invention. FIG. 4 is a flowchart showing a procedure of the DBA process in the MPCP controller 13 of the OLT 1. The MPCP controller 13 repeats the DBA process with a certain period. This flowchart can be implemented by execution of a program by the CPU.

In the flow of FIG. 4, in the DBA process, the uplink transmission request data amount of each ONU 2 is retrieved from a REPORT message received from that ONU 2 and stored at first (2001). Please note that the REPORT message from the ONU 2 is a message which the ONU 2 transmits back as a response to the GATE message transmitted from the OLT 1 to the ONUs at a certain frequency. Next, based on the uplink transmission request data amount of each ONU 2 which is stored and the modulation scheme of each ONU stored in the modulation scheme management table 15, bandwidths (transmission start times and transmission durations) are sequentially and successively allocated to ones of the ONUs for QPSK, each of which has a transmission request (2002).

Subsequently, based on the uplink transmission request data amount and the modulation scheme of each ONU stored in the modulation scheme management table 15, bandwidths (transmission start times and transmission durations) are sequentially and successively allocated to ones of the ONUS for 16 QAM, each of which has a transmission request (2003).

Then, each ONU 2 is notified of information on the bandwidth (the transmission start time and the transmission duration) allocated thereto by using the GATE message (2004). Finally, the MPCP controller 13 notifies the modulation scheme controller 14 of the information on the bandwidth (a schedule for receiving a burst signal of each modulation scheme based on the transmission start time and the transmission duration) allocated to each ONU (2005).

FIG. 9 shows an example of this information provided to the modulation scheme controller 14. As shown in FIG. 9, information 9000 includes ONU-ID, Start Time, and a modulation scheme. The modulation scheme controller 14 has a function of receiving the above information 9000 from the MPCP controller 13 and switching the modulation scheme of the modulation-scheme variable burst-mode optical transmitter/receiver 10 in accordance with the bandwidth information (receiving schedule). In this example, the flowchart in a case of two kinds of modulation schemes is described. However, the number of the kinds of the modulation schemes is not limited to two. Also in a case of three or more kinds of modulation schemes, it is only necessary to perform the allocation process (corresponding to the steps 2002 and 2003 in FIG. 4) as many times as the number of kinds of the modulation schemes. Moreover, the modulation scheme controller 14 may be arranged to perform a search based on ONU-ID in the ONU modulation scheme management table 15, instead of receiving the information 9000 from the MPCP controller 13.

Next, effects achieved by the structure of the optical access system of this embodiment are described.

Figure 5:
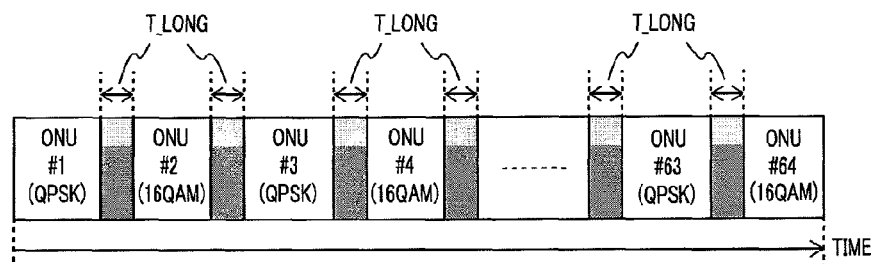
FIG. 5 is a diagram illustrating results of bandwidth allocation for uplink signals in the first embodiment.
Figure 5:
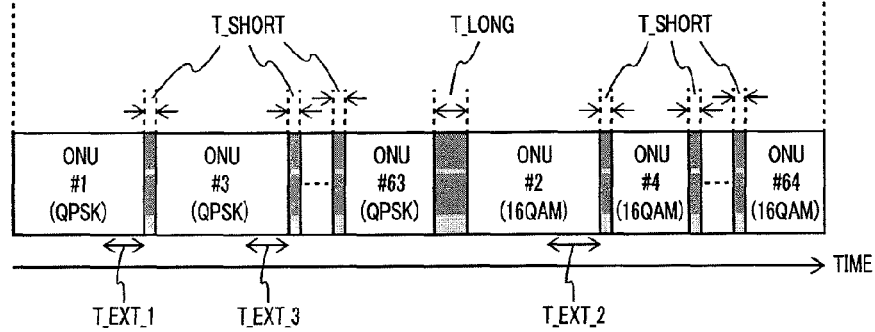

FIG. 5 is a diagram illustrating bandwidth allocation for uplink signals after the DBA process is performed in a case where plural kinds of modulation schemes coexist. In a case where the DBA process for uplink signals is performed, it is necessary to provide a guard time between a burst signal and the next burst signal. The guard time is a time period mainly in which a laser as a light source is turned on and off. In FIG. 5, the horizontal axis represents time, and duration of a burst signal is shown with white while the guard time is shown with gray. In FIG. 5, (a) an example of bandwidth allocation in a case where the structure of this embodiment is not applied in the PON system in which two kinds of modulation schemes (QPSK and 16 QAM) coexist and (b) an example of bandwidth allocation in a case where the structure of this embodiment is applied are shown in an upper portion and a lower portion, respectively. The entire duration shown in FIG. 5 is a DBA period and is fixed to about 1 msec in a normal system design based on a delay request.

As described before, in a case of sequentially receiving uplink burst signals transmitted in accordance with plural kinds of modulation schemes, the modulation scheme of the modulation-scheme variable burst-mode optical transmitter/receiver 10 is switched by an instruction from the modulation scheme controller 14 at a known timing at which the modulation schemes of the sequentially received burst signals is switched. Because a certain time is required for switching the modulation schemes, the guard time in a case where the modulation scheme is switched is longer than that in a case where the burst signals are successively received without switching the modulation scheme. In FIG. 5 the guard time in the case where the modulation scheme is switched is shown with T_long, while the guard time in the case of no switching of the modulation scheme is shown with T_short.

In FIG. 5, it is assumed that there are 64 ONUs, the ONUs having odd serial numbers correspond to QPSK, and the ONUs having even serial numbers correspond to 16 QAM. In a case where the structure of this embodiment is not applied as shown in (a) in the upper portion of FIG. 5, 64 burst signals are allocated in the order of the serial numbers of the ONUs. Therefore, it is necessary to switch the modulation scheme every time the burst signal is received. On the other hand, in a case where the structure of this embodiment is applied as shown in (b) in the lower portion of FIG. 5, burst signals from 32 ONUs having odd serial numbers among 64 burst signals are successively allocated in a former half, while burst signals from 32 ONUs having even serial numbers are successively allocated in a latter half. Thus, a period in which the modulation scheme has to be switched is only one guard time period (T_long) between the burst signal from the ONU #63 and the burst signal from the ONU #2.

Thus, as the effect achieved by applying the structure of this embodiment, a time of "T_long*63−(T_long+62*T_short)" is newly ensured for data transmission as compared with the case where the structure of this embodiment is not applied. In FIG. 5, the time duration allocated to the ONU #1, the ONU #2, and the ONU #3 can be increased by T_ext1, T_ext2, and T_ext3, respectively. In other words this means that a portion of the allocation in the next DBA period, in the case shown in (a) in the upper portion of FIG. 5, is allocated ahead of time, in the case shown in (b) in the lower portion of FIG. 5. That is, in the case where the structure of this embodiment is applied, shown in (b) in the lower portion of FIG. 5, the effect of improving the efficiency of using the bandwidth is achieved.

It is assumed that T_short is about 1 microsecond and T_long is several tens of microseconds, for example. When the number of consecutive times the same modulation scheme appears is increased by even one, a time in which transmission can be performed is increased in a fixed DBA process cycle and therefore the time allocated to the ONU which has a large transmission request data amount can be increased.

Figure 6:
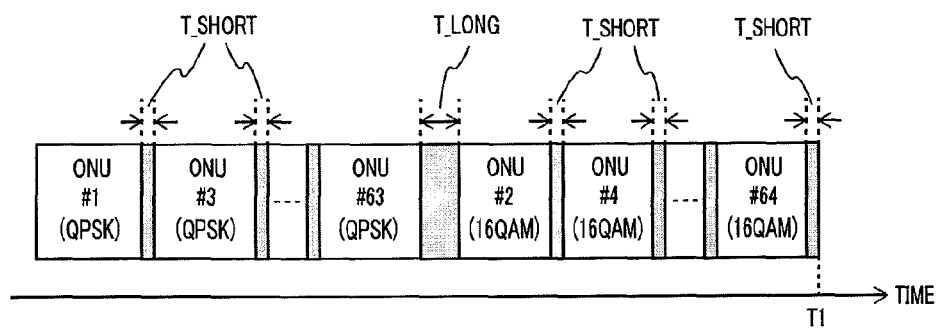
FIG. 6 is a diagram illustrating a result of bandwidth allocation for uplink signals for three periods in the first embodiment.
Figure 6:
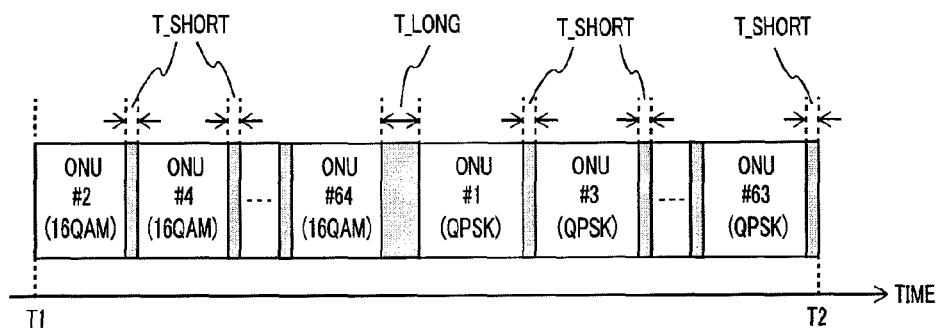
Figure 6:
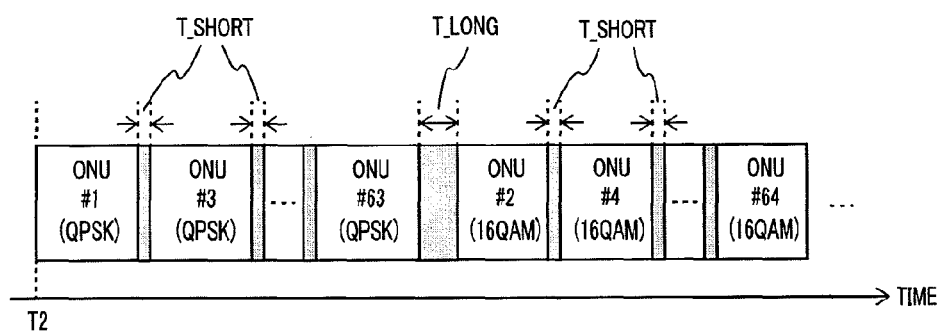

FIG. 6 illustrates bandwidth allocation after the structure of this embodiment is applied for three periods of the DBA process in a case where the ONUs for two kinds of modulation schemes coexist similarly. For the first period shown in the uppermost portion of FIG. 6, QPSK is allocated in the former half while 16 QAM is allocated in the latter half. Then, for the second period shown in the middle portion of FIG. 6, 16 QAM is allocated in the former half while QPSK is allocated in the latter half. For the third period shown in the lowermost portion of FIG. 6, burst signals of QPSK are allocated in the former half again, while those of 16 QAM are allocated in the latter half. In this manner, switching of the modulation scheme is not necessary between cycles of the DBA process, and therefore the efficiency of bandwidth usage can be further improved.

In the PON system of this embodiment, a method can be also considered in which processes for all the modulation schemes are always performed in parallel. In this method, the OLT does not switch the modulation scheme, and the optical signal is split into the number of the kinds of the modulation schemes or is converted into an electric signal and then split into the number of the kinds of the modulation schemes. However, this method is not practical, for example, because wasteful power consumption is caused by simultaneous running of modulation processes which are not effective. Therefore, as in the structure of the PON system of this embodiment, the method in which the modulation scheme of the optical receiver is switched can provide larger effects.

[Second Embodiment]

Next, the second embodiment is described in which the modulation scheme provided in the ONU is not fixed, but a single ONU can handle plural kinds of modulation schemes.

Figure 7:
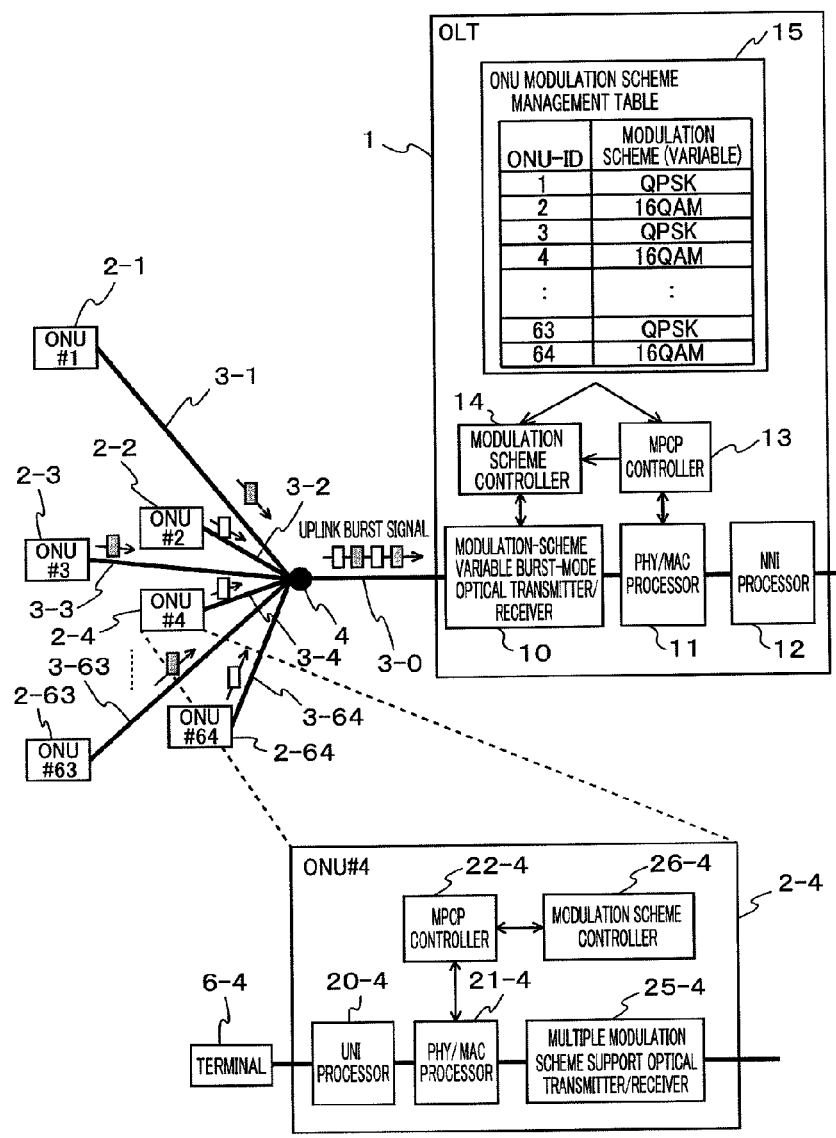
FIG. 7 is a diagram showing an exemplary configuration of a PON system according to a second embodiment of the present invention.

FIG. 7 is a diagram showing an exemplary entire configuration of an optical access system according to the second embodiment. As shown in FIG. 7, the OLT 1 is the same as that in the first embodiment except that the modulation schemes in the ONU modulation scheme management table 15 is dynamically changeable or variable, and therefore the description of the OLT 1 is omitted. The ONU 2-4 shown in FIG. 7 newly includes a multiple modulation scheme support optical transmitter/receiver 25-4 and a modulation scheme controller 26-4. Although not shown in FIG. 7, all the ONUs 2 may support multiple modulation schemes like the ONU 2-4 or only some of the ONUs 2 may support multiple modulation schemes.

In a case where the ONU supports multiple modulation schemes, in the discovery process described referring to FIG. 2 corresponding to the ONU 2, the MPCP controller 13 of the OLT 1 determines an appropriate modulation scheme from a round trip time (RTT) or the like, notifies the ONU 2 of the determination result, and sets the modulation scheme of the multiple modulation scheme support optical transmitter/receiver from the MPCP controller 22-4 of the ONU 2 via the modulation scheme controller 26-4. In this operation, it is only necessary to notify the OLT side from the ONU side of an available modulation scheme by using the Modulation Type field in the REGISTER_REQUEST message shown in FIG. 3, and then to notify the ONU side from the OLT side of the modulation scheme to be employed by the GATE message.

FIG. 8 shows an example of an expanded GATE message for notifying the ONU 2 of the modulation scheme to be employed from the OLT 1. In FIG. 8, Modulation Type 4001 is a specially added field. An available modulation scheme is written in this field and is notified to the corresponding ONU 2.

Various embodiments of the present invention have been described above. However, the present invention is not limited thereto, but may include various modifications. For example, the above embodiments have been described in detail for providing better understanding of the present invention, but those are not intended to limit the present invention to include all the components described in the above description. Moreover, a portion of one of the embodiments can be replaced with the structure of another of the embodiments. Also, the structure of one of the embodiments can be added to the structure of another of the embodiments. In addition, for a portion of the structure of each embodiment, addition of another structure, deletion and replacement can be made. For example, for a method of switching the modulation scheme, modulation signal processing circuits may be provided for the respective modulation schemes and an input signal may be switched by a switch, or the modulation scheme may be implemented by a reconfigurable circuit and switching may be performed by reconfiguring the circuit.

Furthermore, an example has been described in which each of the structures, functions, and operations and the like, described above is partly or entirely implemented by execution of a program by the CPU. However, a portion or entirety of those may be implemented by hardware by designing an integrated circuit.

What is claimed is:

1. An OLT communicable with a plurality of ONUs, comprising:
    a modulation-scheme variable burst-mode optical transmitter/receiver arranged to support a plurality of kinds of modulation schemes and connected to an optical fiber between the plurality of ONUs and the OLT;
    a PHY/MAC (Physical/Media Access Control) processor connected to the modulation-scheme variable burst-mode optical transmitter/receiver;
    an NNI (Network-Network Interface) processor connected to the PHY/MAC processor;
    an MPCP (Multi-Point Control Protocol) controller arranged to control the PHY/MAC processor;
    a modulation scheme controller arranged to control the modulation-scheme variable burst-mode optical transmitter/receiver; and
    an ONU modulation scheme management table arranged to store modulation schemes used by the plurality of ONUs,
    wherein the MPCP controller allocates bandwidths for uplink signals from the plurality of ONUs to the plurality of ONUs, respectively.

2. The OLT according to claim 1, wherein the MPCP controller performs the allocation based on information on the modulation schemes of the respective ONUs stored in the ONU modulation scheme management table in such a manner that bandwidths allocated to ones of the ONUs, which employ the same modulation scheme, are successive.

3. The OLT according to claim 2, wherein when the MPCP controller repeats the allocation of the bandwidth for the uplink signals with a predetermined period, the MPCP controller performs the allocation to first ones of the ONUs employing the same modulation scheme as that of last ones of the ONUs to which the allocation is performed at last in a certain period, in a period following to the certain period.

4. The OLT according to claim 1, wherein the bandwidths for the uplink signals are transmission timings each of which is represented by a transmission start time and a transmission duration of a corresponding one of the uplink signals.

5. The OLT according to claim 4,
    wherein the MPCP controller generates notification messages notifying the respective ONUs of the transmission timing allocated thereto and transmits the notification messages to the respective ONUs, and
    the modulation scheme controller determines a timing of modulation scheme switching in accordance with receiving timings of the uplink signals determined based on the transmission timings, and a next modulation scheme to which switching is directed, and instructs the next modulation scheme at the timing of modulation scheme switching to the modulation-scheme variable burst-node optical transmitter/receiver, and
    the modulation-scheme variable burst-mode optical transmitter/receiver switches to the next modulation scheme based on the instruction.

6. A PON system comprising:
    a plurality of ONUs; and
    an OLT connected to the plurality of ONUs via an optical fiber and capable of supporting a plurality of kinds of modulation schemes,
    wherein the OLT includes a modulation-scheme variable burst-mode optical transmitter/receiver connected to the optical fiber between the plurality of ONUs and the OLT, a PHY/MAC processor connected to the modulation-scheme variable burst-mode optical transmitter/receiver, an NNI processor connected to the PHY/MAC processor, an MPCP controller arranged to control the PHY/MAC processor, a modulation scheme controller arranged to control the modulation-scheme variable burst-mode optical transmitter/receiver, and an ONU modulation scheme management table arranged to store modulation schemes used by the plurality of ONUs, and
    the MPCP controller allocates bandwidths for uplink signals from the plurality of ONUs to the plurality of ONUs, respectively.

7. The PON system according to claim 6, wherein the MPCP controller allocates successive bandwidths to ones of the ONUs, which employ the same one of the modulation schemes, based on information on the modulation schemes of the respective ONUS stored in the ONU modulation scheme management table.

8. The PON system according to claim 6,
    wherein when each of the ONUs is registered in the OLT, the each of the ONUs notifies the OLT of one of the modulation schemes employed by the each of the ONUs, and
    the OLT stores the received modulation scheme of the each of the ONUs to correspond to an identifier of the each of the ONUs in the OLT modulation scheme management table.

9. The PON system according to claim 6,
    wherein the bandwidths for the uplink signals are transmission timings represented by transmission start times and transmission durations of the uplink signals,
    the MPCP controller of the OLT generates notification messages for notifying the respective ONUs of the transmission timings allocated thereto, and transmits the notification messages to the respective ONUs, the modulation scheme controller determines a timing of modulation scheme switching in accordance with receiving timings of the uplink signals determined based on the transmission timings and a next modulation scheme to which switching is directed, and transmits the next modulation scheme to the modulation-scheme variable burst-mode optical transmitter/receiver at the timing of modulation scheme switching, and the modulation-scheme variable burst-mode optical transmitter/receiver switches to the next modulation scheme based on the instruction.

10. The PON system according to claim 6, wherein at least one of the ONUs is capable of supporting the plurality of kinds of modulation schemes and includes a multiple modulation scheme support optical transmitter/receiver, and when the one of the ONUs including the multiple modulation scheme support optical transmitter/receiver is registered in the OLT, the OLT determines one of the modulation schemes which is to be used by the one of the ONUs based on a connection status of the one of the ONUs, and notifies the one of the ONUs of the determined one of the modulation schemes.

* * * * *